(12) United States Patent
Jung et al.

(10) Patent No.: US 9,578,485 B2
(45) Date of Patent: Feb. 21, 2017

(54) METHOD FOR REPORTING MOBILITY STATE INFORMATION IN WIRELESS COMMUNICATION SYSTEM, AND APPARATUS FOR SUPPORTING SAME

(71) Applicant: LG ELECTRONICS INC., Seoul (KR)

(72) Inventors: Sunghoon Jung, Seoul (KR); Youngdae Lee, Seoul (KR); Sungjun Park, Seoul (KR); Seungjune Yi, Seoul (KR); Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 14/413,647

(22) PCT Filed: Jul. 11, 2013

(86) PCT No.: PCT/KR2013/006228
§ 371 (c)(1),
(2) Date: Jan. 8, 2015

(87) PCT Pub. No.: WO2014/010977
PCT Pub. Date: Jan. 16, 2014

(65) Prior Publication Data
US 2015/0172907 A1    Jun. 18, 2015

Related U.S. Application Data

(60) Provisional application No. 61/670,139, filed on Jul. 11, 2012.

(51) Int. Cl.
*H04W 8/08*   (2009.01)
*H04W 24/10*  (2009.01)

(52) U.S. Cl.
CPC ............ *H04W 8/08* (2013.01); *H04W 24/10* (2013.01)

(58) Field of Classification Search
CPC .............................. H04W 8/08; H04W 24/10
See application file for complete search history.

(56) References Cited

U.S. PATENT DOCUMENTS

| | | | |
|---|---|---|---|
| 2009/0143093 A1* | 6/2009 | Somasundaram | H04W 36/32 455/525 |
| 2010/0056175 A1 | 3/2010 | Bachmann et al. | |
| 2012/0014425 A1* | 1/2012 | Zhuang | H04L 1/0015 375/224 |

(Continued)

FOREIGN PATENT DOCUMENTS

| | | |
|---|---|---|
| KR | 10-2009-0126282 | 12/2009 |
| KR | 10-2010-0116108 | 10/2010 |
| KR | 10-2011-0039384 | 4/2011 |

OTHER PUBLICATIONS

PCT International Application No. PCT/KR2013/006228, Written Opinion of the International Searching Authority dated Oct. 22, 2013, 1 page.

*Primary Examiner* — Ajay Cattungal
(74) *Attorney, Agent, or Firm* — Lee Hong Degerman Kang & Waimey

(57) ABSTRACT

Provided is a method for a terminal to report mobility state information in a wireless communication system. The method comprises estimating a mobility state, grouping the estimated mobility state in order to calculate a mobility group state, and reporting mobility state information relating to the mobility group state to a network.

16 Claims, 14 Drawing Sheets

(56) References Cited

U.S. PATENT DOCUMENTS

2013/0201960 A1\* 8/2013 Kim .................. H04W 72/0446
  370/331
2015/0038151 A1\* 2/2015 Dalsgaard ......... H04W 36/0083
  455/444

\* cited by examiner

METHOD FOR REPORTING MOBILITY STATE INFORMATION IN WIRELESS COMMUNICATION SYSTEM, AND APPARATUS FOR SUPPORTING SAME

CROSS-REFERENCE TO RELATED APPLICATIONS

This application is the National Stage filing under 35 U.S.C. 371 of International Application No. PCT/KR2013/006228, filed on Jul. 11, 2013, which claims the benefit of U.S. Provisional Application Ser. No. 61/670,139, filed on Jul. 11, 2012, the contents of which are hereby incorporated by reference herein in their entirety.

BACKGROUND OF THE INVENTION

Field of the Invention

The present invention relates to wireless communication and, more particularly, to a method for reporting information about the mobility of user equipment in a wireless communication system and an apparatus for supporting the same.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE Mirco cells, femto cells, and pico cells having small service coverage may be installed at specific locations within the coverage of a macro cell having wide coverage. Such a call may be called a small cell.

Since user equipment representative of a mobile device moves, quality of service that is now provided may be deteriorated, or a cell capable of providing better service may be discovered. Accordingly, user equipment may move to a new cell, which is the execution of the movement of the user equipment.

Frequency that user equipment moves between cells may be changed because each cell has fixed service coverage and the user equipment moves on a wireless communication system at a variable speed. A method of scaling Mobility State Estimation (MSE) and a mobility parameter has been supported in order for user equipment to properly move between cells by taking the actual movement situation of the user equipment into consideration.

As cells having various sizes are spread within a wireless communication system, an area in which a network may use information about the mobility of user equipment is further widened. To this end, a method for reporting, by user equipment, information relating to a mobility state to a network needs to be proposed.

SUMMARY OF THE INVENTION

An object of the present invention is to provide a method for reporting information about the mobility of user equipment in a wireless communication system and an apparatus for supporting the same.

In an aspect, there is provided a method of reporting mobility state information performed by user equipment in a wireless communication system. The method includes estimating mobility states, computing a mobility group state by grouping the estimated mobility states and reporting mobility state information about the mobility group state to a network.

The method may further include checking whether the mobility group state has satisfied a report condition of the mobility state information and determining to report the mobility state information if the report condition of the mobility state information is satisfied.

If the mobility group state has been changed as a result of a comparison between the mobility group state and a previous mobility group state, the mobility group state may satisfy the report condition of the mobility state information.

The mobility state information may indicate that the mobility group state has been changed.

The mobility state information may be indicative of the mobility group state.

If the mobility group state is a specific mobility group state, the mobility group state may satisfy the report condition of the mobility state information.

The mobility state information may indicate that the computed mobility group state corresponds to the specific mobility group state.

The specific mobility group state may be configured by the network.

Estimating the mobility state may comprise determining the estimated mobility states based on a number of times that the user equipment has performed cell movements for a specific time interval based on Mobility State Estimation (MSE), and the estimated mobility states are determined to be one of a normal mobility state, a medium mobility state, and a high mobility state.

Computing the mobility group state may comprise: determining the mobility group state to be a first mobility group state if the estimated mobility state is the normal mobility state or the medium mobility state and determining the mobility group state to be a second mobility group state if the estimated mobility state is the high mobility state.

Computing the mobility group state may comprise: determining the mobility group state to be a first mobility group state if the estimated mobility state is the normal mobility state and determining the mobility group state to be a second mobility group state if the estimated mobility state is the high mobility state or the medium mobility state.

The method may further comprise: receiving a grouping configuration indicative of a criterion for grouping the estimated mobility states from the network, wherein grouping the estimated mobility states is performed based on the grouping configuration.

The mobility state information may be included in an RRC connection configuration-complete message or an RRC connection reestablishment-complete message transmitted when the user equipment establishes or reestablishes Radio Resource Control (RRC) connection with the network and transmitted.

The mobility state information may be included in a handover-complete message transmitted upon handover and transmitted.

The mobility state information may be included in a user equipment information message transmitted by the user equipment in response to a user equipment information request from the network and transmitted.

In another aspect, there is provided a user equipment operating in a wireless communication system. The user equipment comprises a Radio Frequency (RF) unit sending and receiving radio signals and a processor functionally coupled with the RF unit and driven, wherein the processor is configured to: estimate mobility states, compute a mobility group state by grouping the estimated mobility states and report mobility state information about the mobility group state to a network.

In accordance with an embodiment of the present invention, user equipment can provide a network with information about a mobility group state instead of a mobility state. Information about a mobility group state can be provided during a process in which user equipment configures RRC connection with a network because it can be implemented to have a smaller size than information directly indicative of the mobility state. Accordingly, further improved service can be configured/managed so that it is provided to user equipment because information relating to a mobility state is provided to a network when the user equipment joins the network.

In accordance with an embodiment of the present invention, user equipment can report an estimated/computed mobility group state to a network depending on the estimated/computed mobility group state. Accordingly, a network can check the mobility state of user equipment, in particular, whether user equipment corresponds to a mobility state interested in by the network. Efficiency can be further improved because a network can be managed based on reported information about the mobility state of user equipment.

DESCRIPTION OF EXEMPLARY EMBODIMENTS

Figure 1:
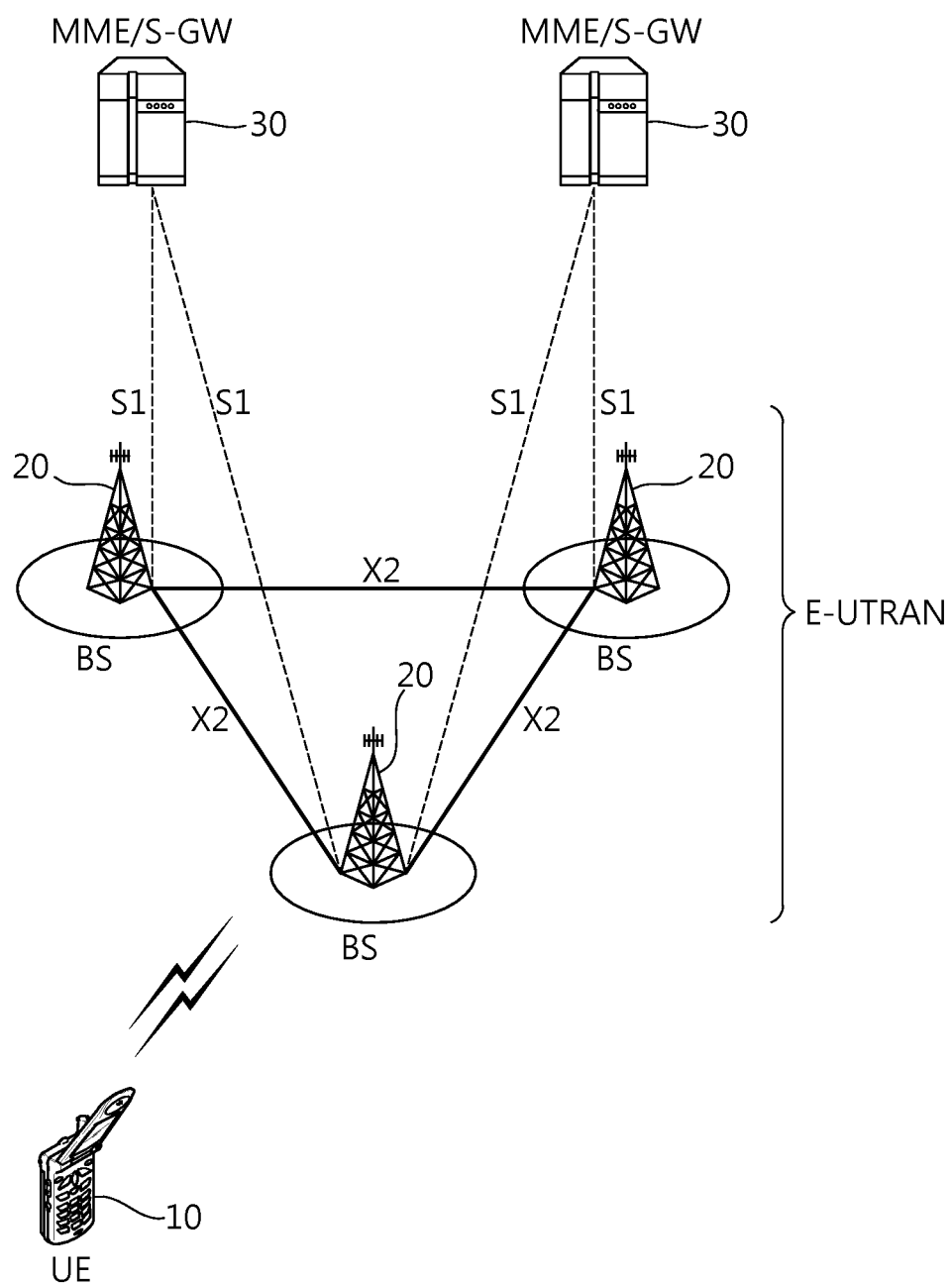
FIG. 1 illustrates a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
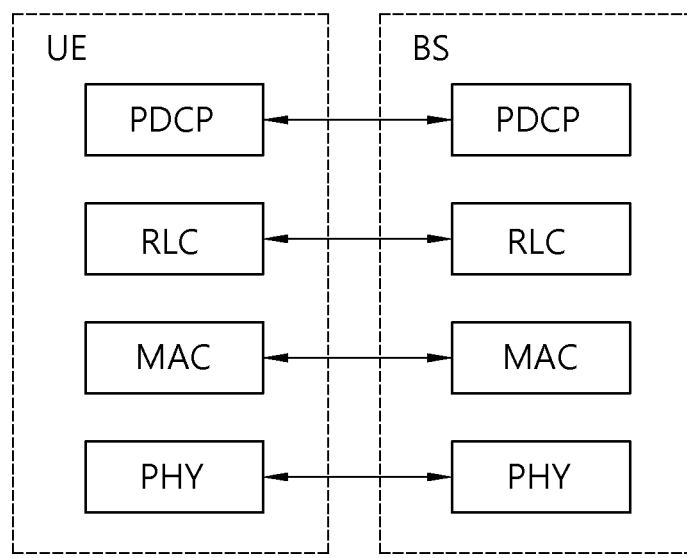
FIG. 2 is a block diagram showing the structure of a wireless protocol on the user plane.
Figure 3:
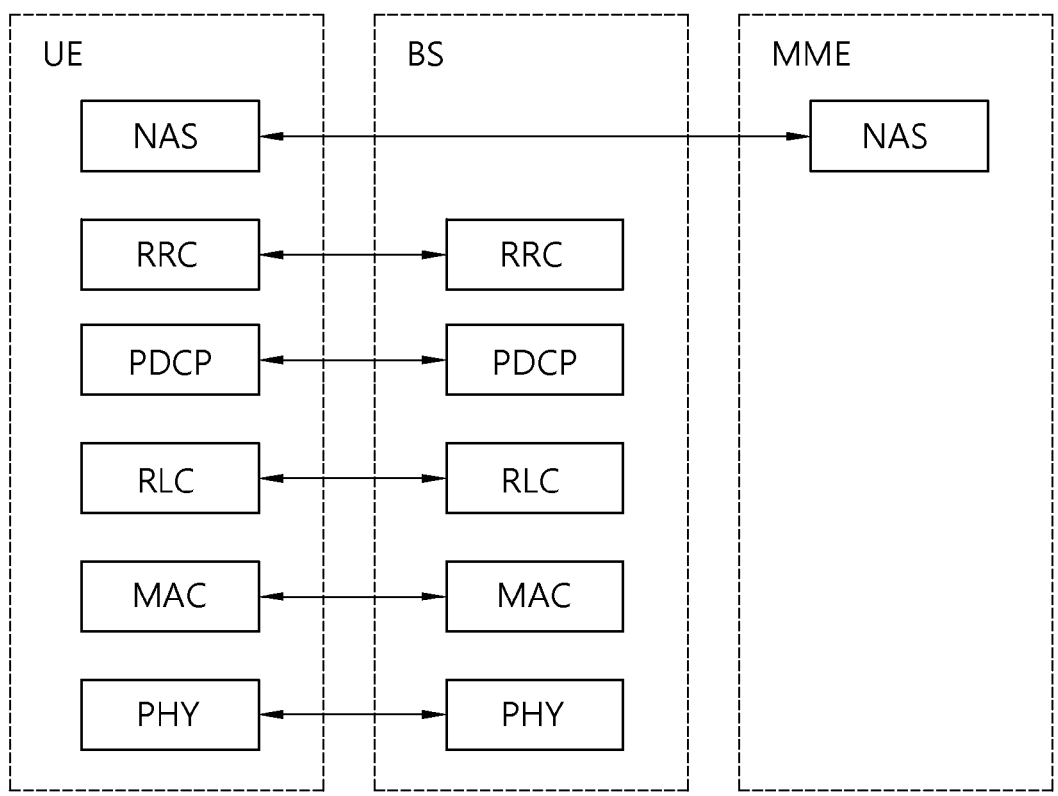
FIG. 3 is a block diagram showing the structure of a wireless protocol on the control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell.

In accordance with Paragraph 5.2.2 of 3GPP TS 36.331 V8.7.0 (2009-09) "Radio Resource Control (RRC); Protocol specification (Release 8)", the system information is classified into a Master Information Block (MIB), a Scheduling Block (SB), and a System Information Block (SIB). The MIB informs UE of the physical configuration of a corresponding cell, for example, a bandwidth. The SB informs UE of information about the transmission of SIBs, for example, a transmission cycle. The SIB is a set of pieces of correlated system information. For example, a specific SIB includes only information about surrounding cells, and a specific SIB includes only information about an uplink radio channel used by UE.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
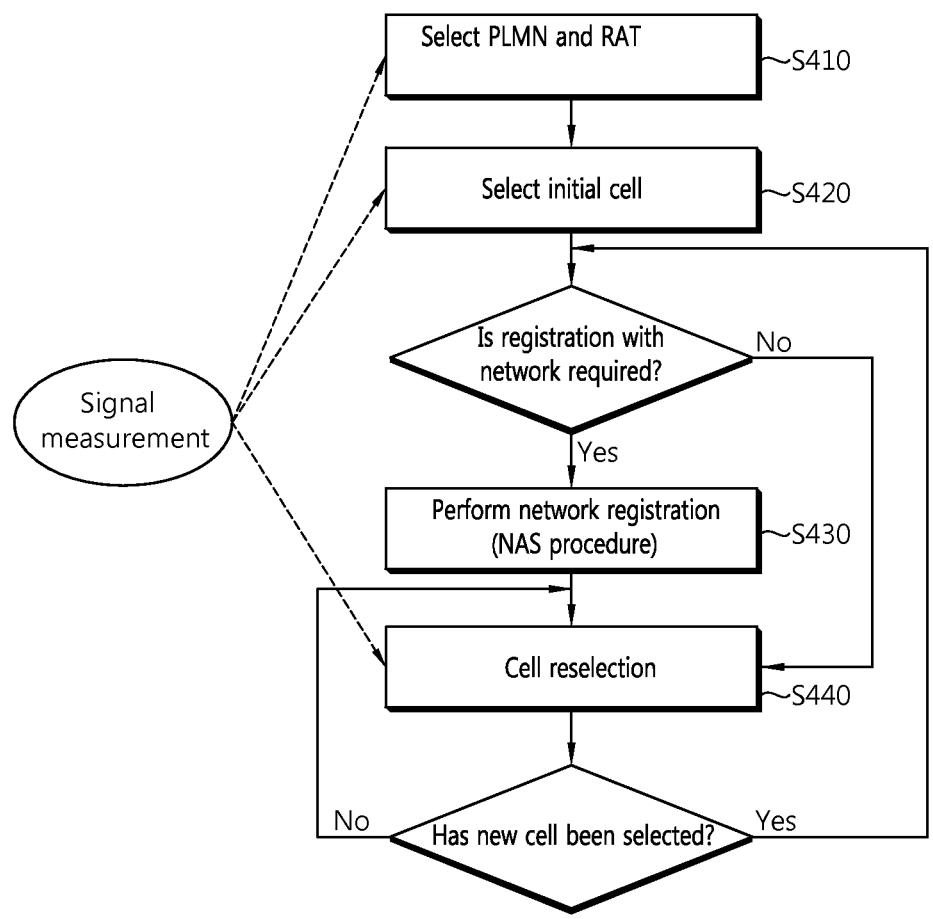
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
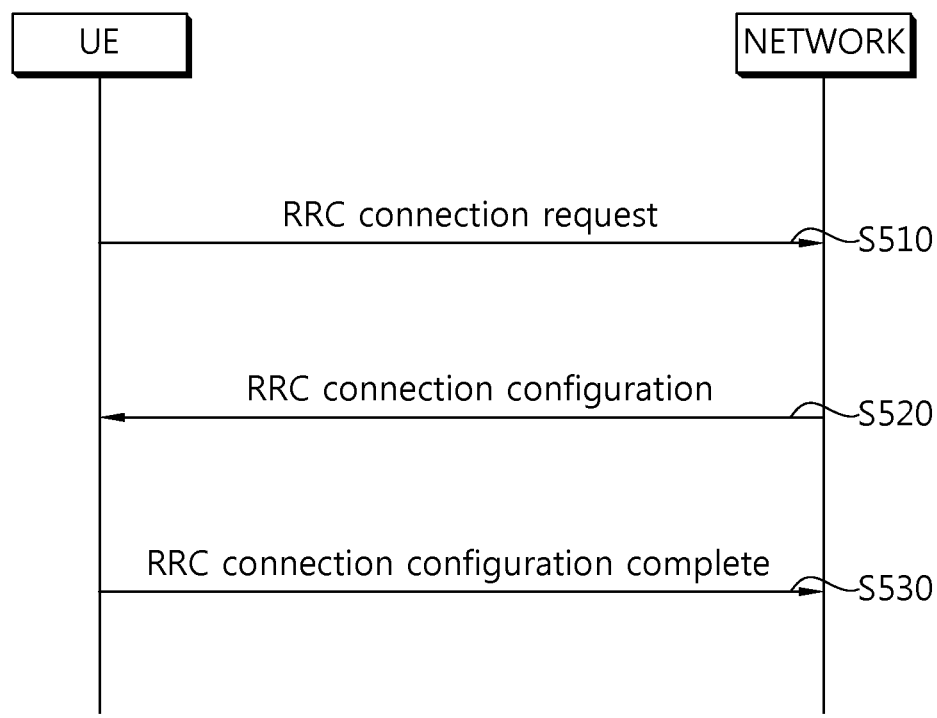
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
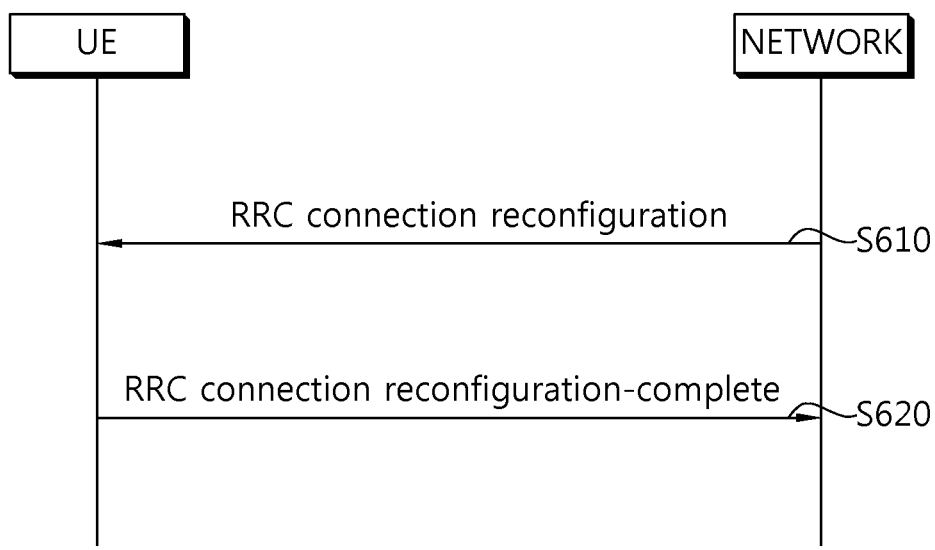
FIG. 6 is a flowchart illustrating an RRC connection reconfiguration process.

FIG. 6 is a flowchart illustrating an RRC connection reconfiguration process. An RRC connection reconfiguration is used to modify RRC connection. The RRC connection reconfiguration is used for the establishment/modification/release of RBs and the execution and measurement setup/modification/release of handover.

A network sends an RRC connection reconfiguration message for modifying RRC connection to UE (S610). In response to the RRC connection reconfiguration, the UE sends, to the network, an RRC connection reconfiguration-complete message used to check the successful completion of the RRC connection reconfiguration (S620).

A Public Land Mobile Network (PLMN) is described below.

The PLMN is a network deployed and managed by a mobile network operator. Each mobile network operator manages one or more PLMNs. Each PLMN may be identified by Mobile Country Code (MCC) and Mobile Network Code (MNC). Information about the PLMN of a cell is included in system information and broadcasted.

In PLMN selection, cell selection, and cell reselection, UE may take into consideration various types of PLMNs.

A Home PLMN (HPLMN): a PLMN having MCC and MNC matched with those of a UE IMSI.

An Equivalent HPLMN (EHPLMN): a PLMN equivalently treated as an HPLMN.

A Registered PLMN (RPLMN): a PLMN whose location has been successfully registered.

An Equivalent PLMN (EPLMN): a PLMN equivalently treated as an RPLMN.

Each mobile service demander joins an HPLMN. When an HPLMN or an EHPLMN provides UE with common service, the UE is not in a roaming state. In contrast, a PLMN provides UE with service in addition to an HPLMN/EHPLMN, the UE is in a roaming state, and the PLMN is called a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

A procedure of selecting, by UE, a cell is described in detail below.

When UE is powered on or camps on a cell, the UE performs procedures for selecting/reselecting a cell having proper quality and being provided with service.

UE in the RRC idle state needs to always select a cell having proper quality and to be prepared to be provided with service through the cell. For example, UE that is initially powered on needs to select a cell having proper quality in order to register it with a network. If UE in the RRC connection state enters the RRC idle state, the UE needs to select a cell on which the UE will camp in the RRC idle state. As described above, a process of selecting, by UE, a cell that satisfies some conditions in order to camp on in a service standby state, such as the RRC idle state, is called cell selection. An important point is that the cell rapidly selects a cell because cell selection is performed in the state in which the UE has not determined a cell on which the UE will camp in the RRC idle state. Accordingly, if a cell is a cell that provides the quality of a radio signal of a specific reference or higher, the cell may be selected in the cell selection process of UE although the cell is not a cell that provides the best radio signal quality to the UE.

A method and procedure in which UE selects a cell in 3GPP LTE is described in detail with reference to 3GPP TS 36.304 V8.5.0 (2009-03) "User Equipment (UE) procedures in idle mode (Release 8)."

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. Cell reselection priority provided through broadcast signaling may be called common priority, and cell reselection priority set by a network for each piece of UE may be called dedicated priority. When receiving dedicated priority, UE may also receive a validity time related to the dedicated priority. When receiving the dedicated priority, the UE initiates a validity timer set to the validity time received along with the dedicated priority. While the validity timer operates, the UE applies the dedicated priority in RRC idle mode. When the validity timer expires, the UE discards the dedicated priority and applies common priority again.

For inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_s = Q_{meas,s} + Q_{hyst}, \quad R_n = Q_{meas,n} - Q_{offset}$$

In this case, $R_s$ is the ranking criterion of a serving cell, $R_n$ is the ranking criterion of a neighboring cell, $Q_{meas,s}$ is the quality value of the serving cell measured by UE, $Q_{meas,n}$ is the quality value of the neighboring cell measured by UE, $Q_{hyst}$ is the hysteresis value for ranking, and $Q_{offset}$ is an offset between the two cells.

In intra-frequency, if UE receives an offset "$Q_{offsets,n}$" between a serving cell and a neighboring cell, $Q_{offset} = Q_{offsets,n}$. If UE does not receive $Q_{offsets,n}$, $Q_{offset} = 0$.

In inter-frequency, if UE receives an offset "$Q_{offsets,n}$" for a corresponding cell, $Q_{offset} = Q_{offsets,n} + Q_{frequency}$. If UE does not receive "$Q_{offsets,n}$", $Q_{offset} = Q_{frequency}$.

If the ranking criterion $R_s$ of a serving cell and the ranking criterion $R_n$ of a neighboring cell are changed in a similar state, ranking priority is frequency changed as a result of the change, and UE may alternately reselect the twos. $Q_{hyst}$ is a parameter that gives hysteresis to cell reselection so that UE is prevented from to alternately reselecting two cells.

UE measures $R_s$ of a serving cell and $R_n$ of a neighboring cell according to the above equation, considers a cell having the greatest ranking reference value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Radio Link Monitoring (RLM) is described below.

UE monitors downlink quality based on a cell-specific reference signal in order to detect the quality of the downlink radio link of a PCell. The UE estimates the quality of a downlink radio link in order to monitor the quality of the downlink radio link of the PCell, and compares the estimated quality with threshold values Qout and Qin. The threshold value Qout is defined as a level at which a downlink radio link is unable to be stably received, which corresponds to a block error rate of 10% of hypothetical PDCCH transmission by taking into consideration a PCFICH error. The threshold value Qin is defined as a downlink radio link quality level at which a downlink radio link is able to be more stably received than compared to the level of Qout, which corresponds to a block error rate of 2% of hypothetical PDCCH transmission by taking into consideration a PCFICH error.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
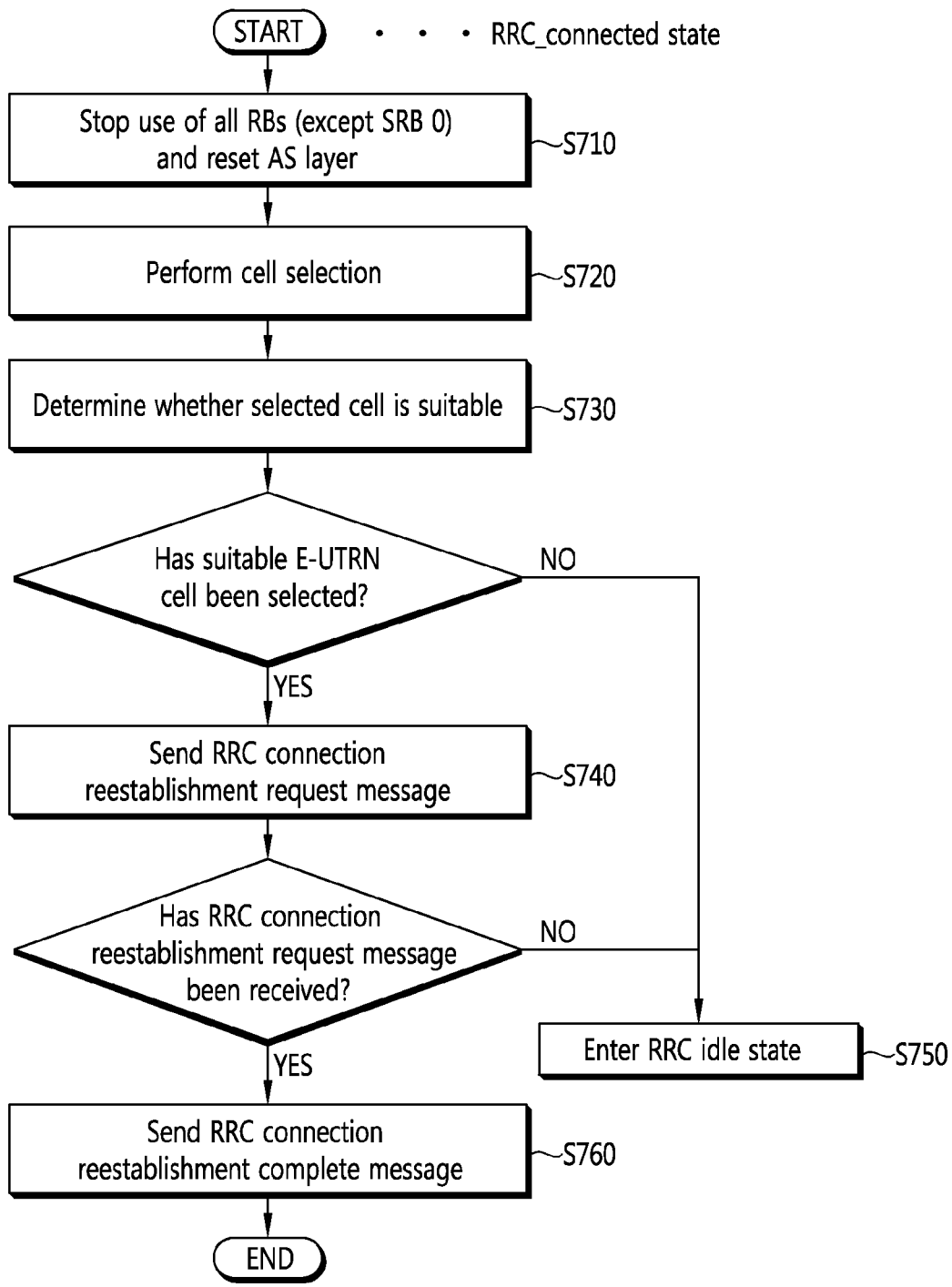
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

A report on an RLF is described below.

When an RLF occurs or a handover failure occurs, UE reports such a failure event to a network in order to support the Mobility Robustness Optimization (MRO) of the network.

After RRC connection re-establishment, the UE may provide the RLF report to the eNB. Wireless measurement includes in the RLF report may be used for a potential reason of a failure in order to identify coverage problems. Such information may be used to borrow such events as input to other algorithms by excluding the events in MRO evaluation for an intra-LTE mobility connection failure.

If RRC connection re-establishment fails or UE does not perform RRC connection re-establishment, the UE may be connected again in idle mode, and may generate a valid RLF report on an eNB. For such an object, the UE may store information related to the most recent RLF or handover failure, and may inform an LTE cell that an RLF report is valid every RRC connection (re)establishment and handover until the RLF report is fetched by a network or for 48 hours after an RLF or handover failure is detected.

The UE maintains the information for a state shift and a change of RAT, and indicates that the RLF report is valid again after returning back to LTE RAT.

In an RRC connection establishment procedure, the validity of an RLF report means that UE has experienced obstruction, such as a connection failure, and an RLF report attributable to the failure has not yet been transferred to a network. The RLF report from the UE includes the following information.

If the last cell (in the case of an RLF) that has provided service to the UE or the E-CGI of a target for handover has not been known, a PCI and frequency information are used instead.

The E-CGI of a cell at which re-establishment has been attempted.

When initializing the last handover, for example, when a message 7 (an RRC connection reconfiguration) is received by the UE, the E-CGI of a cell that has provided service to the UE.

The time that has elapsed from the initialization of the last handover to a connection failure.

Information indicative of whether the connection failure is attributable to an RLF or a handover failure.

Wireless measurements.

The location of a failure.

The eNB that has received the RLF from the UE may forward the report to an eNB that had provided service to the UE prior to the reported connection failure. Wireless measurements included in the RLF report may be used to identify coverage issues as a potential cause of an RLF. Such information may be used to send events to other algorithm as input again by excluding the events from the MRO evaluation of an intra-LTE mobility connection failure.

Measurement and a measurement report are described below.

In a mobile communication system, to support the mobility of UE is essential. Accordingly, the UE continues to measure the quality of a serving cell from which the UE is now provided with service and the quality of a neighbor cell. The UE reports measured results to a network on a proper time, and the network provides optimum mobility to the UE through handover, etc. In general, measurement for this purpose is called a Radio Resource Management (RRM) measurement.

In order to provide information that may help an operator to operate a network in addition to the mobility support object, UE may perform measurement for a specific object set by the network, and may report measured results thereof to the network. For example, UE receives the broadcast information of a specific cell that has been determined by the network. The UE may report the cell identity (this is also called a global cell identity) of the specific cell, identity information about the location to which the specific cell belongs (e.g., Tracking Area Code) and/or other pieces of cell information (e.g., whether or not it is a member of a Closed Subscriber Group (CSG) cell) to the serving cell.

If UE checks that the quality of a specific area is very poor through measurement while moving, the UE may report location information and measured results for cells having poor quality to a network. A network may perform network optimization based on the reports of the measured results of UEs that help the operation of the network.

In a mobile communication system in which frequency reuse (frequency reuse factor) is 1, mobility is chiefly performed between difference cells that belong to the same frequency band. Accordingly, in order to well guarantee the mobility of UE, the UE needs to well measure the quality of neighboring cells having the same center frequency as a serving cell and information about the cells. As described above, the measurement of a cell having the same center frequency as a serving cell is called intra-frequency measurement. UE performs intra-frequency measurement and reports measured results thereof to a network on a proper time so that the object of corresponding measured results is achieved.

A mobile communication operator may operate a network using a plurality of frequency bands. If the service of a communication system is provided through a plurality of frequency bands, in order to guarantee optimum mobility for UE, the UE needs to well measure the quality of neighboring cells having center frequencies from the center frequency of a serving cell and information about the cells. As described above, the measurement of a cell having a center frequency different from the center frequency of a serving cell is called inter-frequency measurement. UE needs to be able to perform inter-frequency measurement and to report measured results thereof to a network on a proper time.

If UE supports the measurement of a network based on another RAT, the UE may measure the cells of a corresponding network through the configuration of a BS. Such measurement is called inter-Radio Access Technology (RAT) measurement. For example, RAT may include an UMTS Terrestrial Radio Access Network (UTRAN) and a GSM EDGE Radio Access Network (GERAN) that comply with the 3GPP standard and may also include CDMA 2000 systems that comply with the 3GPP2 standard.

Figure 8:
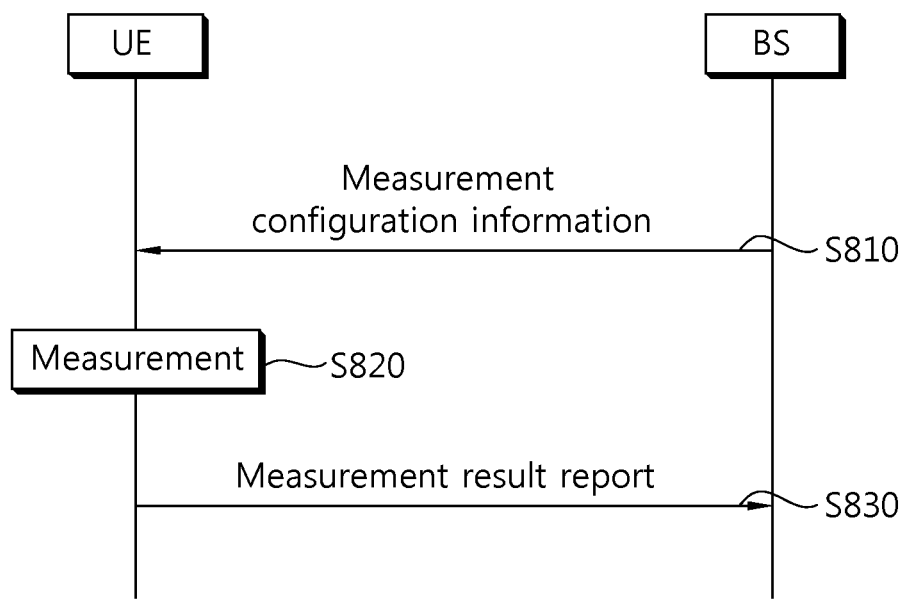
FIG. 8 is a flowchart illustrating a method of performing measurement.

FIG. 8 is a flowchart illustrating an existing method of performing measurement.

UE receives measurement configuration information from a BS (S810). A message including the measurement configuration information is called a measurement configuration message. The UE performs measurement based on the measurement configuration information (S820). If a result of the measurement satisfies a report condition within the measurement configuration information, the UE reports the result of the measurement to the BS (S830). A message including the result of the measurement is called a measurement report message.

The measurement configuration information may include the following information.

(1) Measurement object information: this is information about the object on which UE will perform measurement. A measurement object includes at least one of an intra-frequency measurement object that is the object of measurement within a cell, an inter-frequency measurement object that is the object of measurement between cells, and an inter-RAT measurement object that is the object of inter-RAT measurement. For example, the intra-frequency measurement object may indicate a neighboring cell having the same frequency band as a serving cell, the inter-frequency measurement object may indicate a neighboring cell having a frequency band different from that of a serving cell, and the inter-RAT measurement object may indicate a neighboring cell having an RAT different from that of a serving cell.

(2) Reporting configuration information: this is information about a report condition regarding the time when UE reports a measured result and a report type. The report configuration information may consist of a list of report configurations. Each report configuration may include a report criterion and a report format. The report criterion is a criterion that triggers the transmission of a measured result by UE. The report criterion may be the cycle of a measurement report or a single event for a measurement report. The report format is information about that UE will configure a measured result using what type.

(3) Measurement identity information: this is information about a measurement identity that associates a measurement object with a reporting configuration so that UE determines to report what measurement object when and in what type. The measurement identity information may be included in a measurement report message and may be indicative that a measured result is about what measurement object and that a measurement report has occurred due to what report condition.

(4) Quantity configuration information: this is information about a parameter for setting the filtering of a measurement unit, a report unit and/or a measured result value.

(5) Measurement gap information: this is information about a measurement gap, that is, a section that may be used for UE to perform only measurement by not taking into consideration data transmission with a serving cell because downlink transmission or uplink transmission has not been scheduled.

In order to perform a measurement process, UE has a measurement object list, a measurement reporting configuration list, and a measurement identity list.

In 3GPP LTE, a BS may configure only one measurement object in UE with respect to a single frequency band. In accordance with Paragraph 5.5.4 of 3GPP TS 36.331 V8.5.0 (2009-03) "Evolved Universal Terrestrial Radio Access (E-UTRA) Radio Resource Control (RRC); Protocol specification (Release 8)," events that trigger measurement reports are defined in the following table.

TABLE 1

| EVENT | REPORT CONDITION |
|---|---|
| Event A1 | Serving becomes better than threshold |
| Event A2 | Serving becomes worse than threshold |
| Event A3 | Neighbor becomes offset better than serving |
| Event A4 | Neighbor becomes better than threshold |
| Event A5 | Serving becomes worse than threshold1 and neighbor becomes better than threshold2 |
| Event B1 | Inter RAT neighbor becomes better than threshold |
| Event B2 | Serving becomes worse than threshold1 and inter RAT neighbor becomes better than threshold2 |

If the measured result of UE satisfies a set event, the UE sends a measurement report message to a BS.

Figure 9:
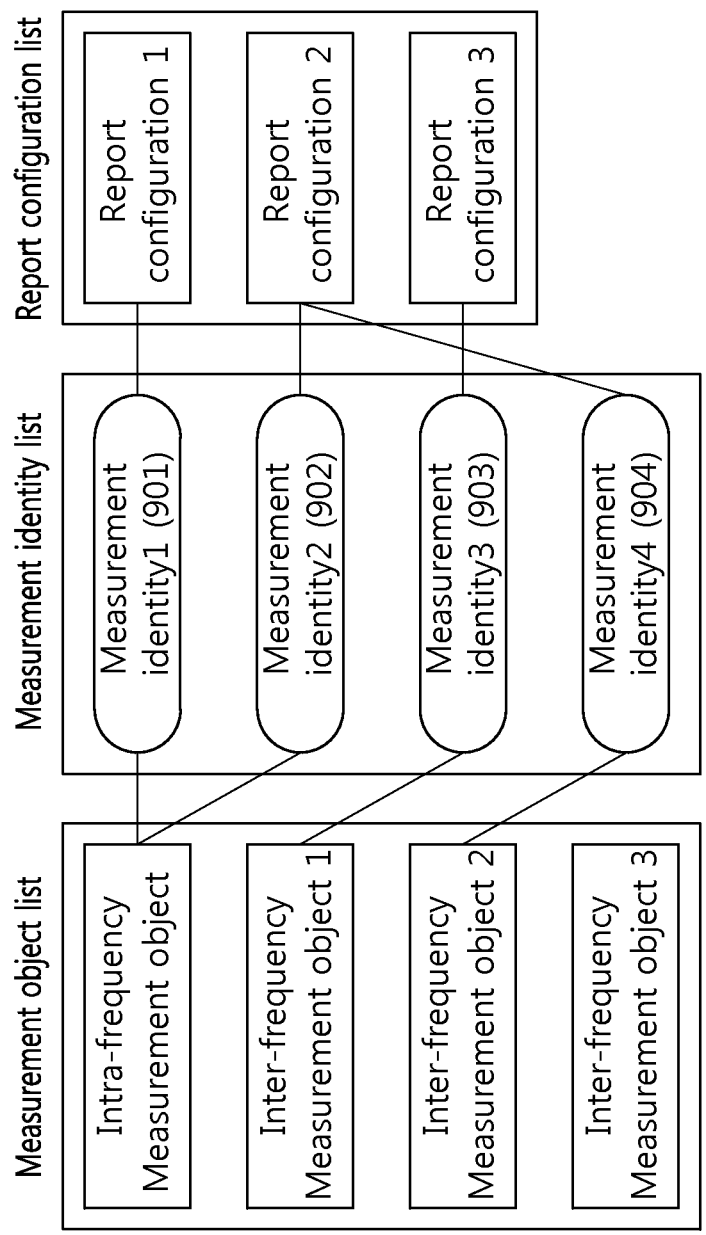
FIG. 9 illustrates an example of a measurement configuration configured to UE.

FIG. 9 illustrates an example of a measurement configuration configured in UE.

First, a measurement identity 1 901 connects an intra-frequency measurement object and a reporting configuration 1. UE performs intra-cell measurement, and the reporting configuration 1 is used to determine the criterion of a measured result report and a report type.

A measurement identity 2 902 is connected to the intra-frequency measurement object like the measurement identity 1 901, but it connects the intra-frequency measurement object to a reporting configuration 2. UE performs measurement, and the reporting configuration 2 is used to determine the criterion of a measured result report and a report type.

In accordance with the measurement identity 1 901 and the measurement identity 2 902, UE sends a measured result of the intra-frequency measurement object although the measured result satisfies any one of the reporting configuration 1 and the reporting configuration 2.

A measurement identity 3 903 connects an inter-frequency measurement object 1 and a reporting configuration 3. UE reports a measured result of the inter-frequency measurement object 1 if the measured result satisfies the report condition included in the reporting configuration 1.

A measurement identity 4 904 connects an inter-frequency measurement object 2 and the reporting configuration 2. UE reports a measured result of the inter-frequency measurement object 2 if the measured result satisfies the report condition included in the reporting configuration 2.

Meanwhile, a measurement object, a reporting configuration and/or a measurement identity may be added, changed and/or deleted. This may be indicated in such a manner that a BS sends a new measurement configuration message to UE or sends a measurement configuration change message to the UE.

Figure 10:
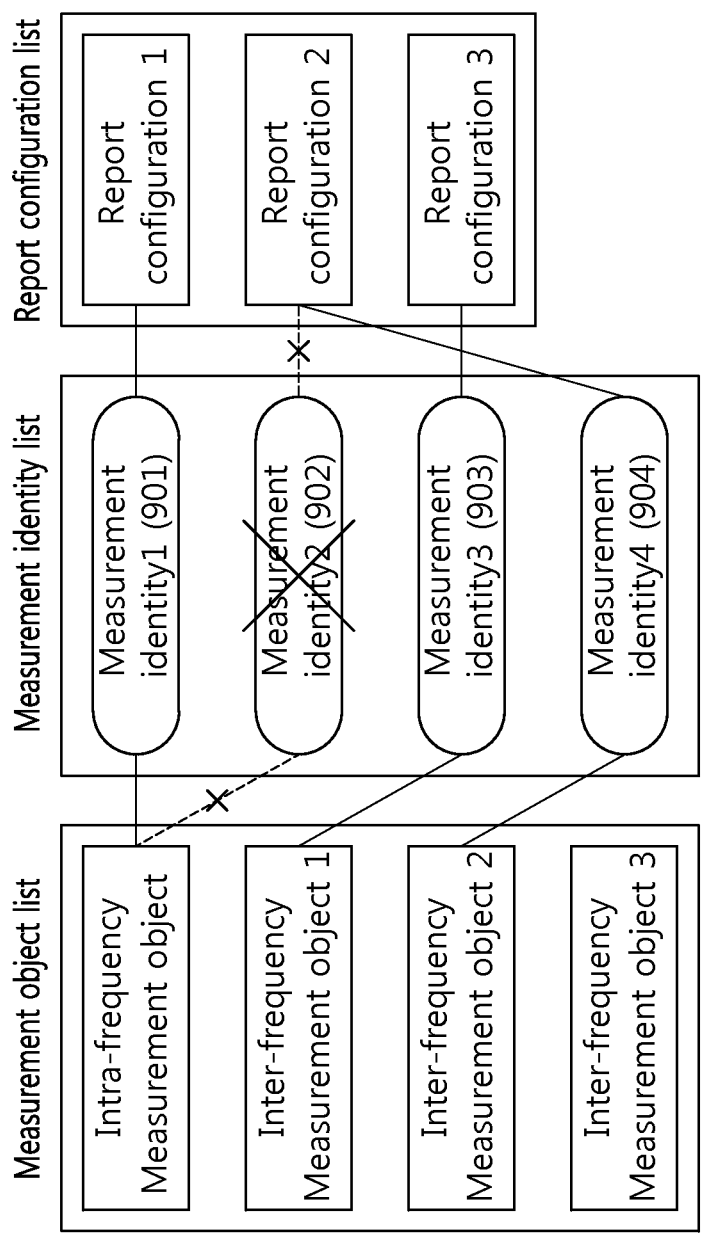
FIG. 10 illustrates an example in which a measurement identity is deleted.

FIG. 10 illustrates an example in which a measurement identity is deleted. When a measurement identity 2 902 is deleted, the measurement of a measurement object associated with the measurement identity 2 902 is stopped, and a measurement report is not transmitted. A measurement object or reporting configuration associated with a measurement identity may not be changed.

Figure 11:
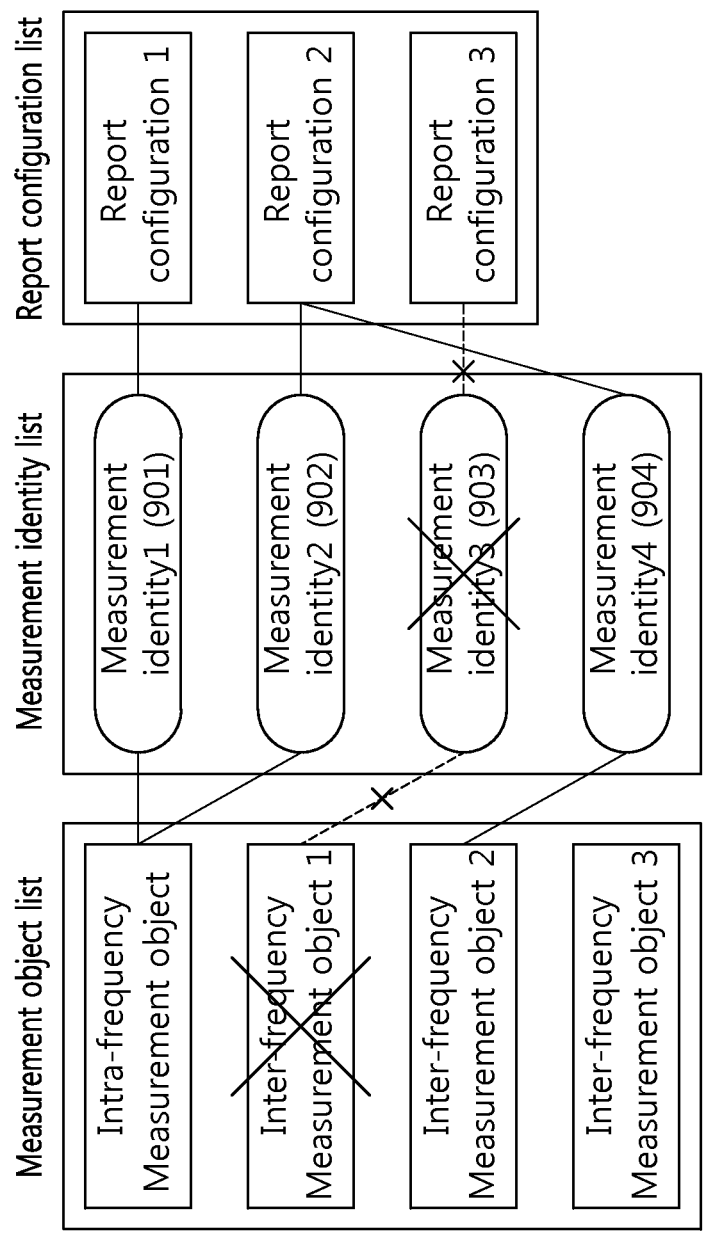
FIG. 11 illustrates an example in which a measurement object is deleted.

FIG. 11 illustrates an example in which a measurement object is deleted. When an inter-frequency measurement object 1 is deleted, UE also deletes an associated measurement identity 3 903. The measurement of the inter-frequency measurement object 1 is stopped, and a measurement report is not transmitted. However, a reporting configuration associated with the deleted inter-frequency measurement object 1 may not be changed or deleted.

When a reporting configuration is removed, UE also removes an associated measurement identity. The UE stops the measurement of a measurement object associated by the associated measurement identity. However, a measurement object associated with the deleted reporting configuration may not be changed or deleted.

A measurement report may include a measurement identity, the measured quality of a serving cell, and a measured result of a neighboring cell. The measurement identity identifies a measurement object whose measurement report has been triggered. The measured result of a neighboring cell may include the cell identity and measured quality of the neighboring cell. The measured quality may include at least one of Reference Signal Received Power (RSRP) and Reference Signal Received Quality (RSRQ).

The scaling of a mobility-related parameter that affects the determination of UE regarding whether or not to perform mobility based on the mobility state of the UE is described below. If UE passes through cells at high speed, the UE may be subjected to an unavailable service state because a movement to neighboring cells is not properly performed. Accordingly, if the value of a mobility-related parameter is optimized for the speed of UE depending on the speed of the UE, the performance of the movement of the UE is improved. If UE determines a mobility state (performs Mobility State Estimation (MSE)) and scales a parameter related to the determination of mobility based on the determined mobility state of the UE as described above, the movement of the UE may be supported more efficiently.

The mobility states of UE determined by MSE may be classified into a high mobility state, a medium mobility state, and a normal mobility state. Each of the mobility states may be determined based on the number of times that UE has performed handover and/or the number of times that UE has performed cell reselection.

UE in the RRC_IDLE state performs cell reselection if a cell reselection condition is satisfied. If the number of times that the UE has performed cell reselection during a specific time interval $T_{CRmax}$ exceeds a first threshold $N_{CR\_H}$, the mobility state of the UE satisfies the condition of the high mobility state. Meanwhile, if the number of times that the UE has performed cell reselection during the specific time interval $T_{CRmax}$ exceeds a second threshold $N_{CR\_M}$ and does not exceed the first threshold $N_{CR\_H}$, the mobility state of the UE satisfies the condition of the medium mobility state. If the number of times that the UE has performed cell reselection during the specific time interval $T_{CRmax}$ does not exceed the second threshold $N_{CR\_M}$, the mobility state of the UE satisfies the condition of the normal mobility state. In this case, if the UE has consecutively performed cell reselection between two identical cells, the number of times that the UE has consecutively performed such cell reselection may not be counted as the number of times that the UE has performed cell reselection.

UE in the RRC_CONNECTED state reports a measured result and performs handover, if a specific condition is satisfied when measuring a neighboring cell. If the number of times that the UE has performed handover during a specific time interval exceeds a first threshold, the mobility state of the UE satisfies the condition of the high mobility state. Meanwhile, if the number of times that the UE has performed handover during the specific time interval exceeds a second threshold and does not exceed the first threshold, the mobility state of the UE satisfies the condition of the medium mobility state. If the number of times that the UE has performed handover during the specific time interval does not exceed the second threshold, the mobility state of the UE satisfies the condition of the normal mobility state.

UE in the RRC_IDLE state or the RRC_CONNECTED state may enter a corresponding mobility state if the UE detects that the condition of the aforementioned mobility state has been satisfied. To enter a corresponding mobility state may mean that the UE determines its own mobility state to be the corresponding mobility state. In this case, if both the high mobility state condition and the medium mobility state condition are determined to be not satisfied during a specific time interval, the UE may enter the normal mobility state.

After determining a mobility state, UE may scale a mobility parameter based on the mobility state. UE in the RRC_IDLE state may scale a Treselection parameter, and UE in the RRC_CONNECTED state may scale a TimeToTrigger parameter. Such scaling may be implemented by multiplying the Treselection parameter or TimeToTrigger parameter by a specific scaling factor. The scaling factor may be different depending on the mobility state of the UE. For example, a scaling factor in the high mobility state may be smaller than that in the medium mobility state. In the normal mobility state, scaling may not be performed. Such scaling may be performed by a network or a cell in addition to UE, and information about the execution of scaling may be provided to UE.

First, scaling applied to the Treselection parameter that is used for UE in the RRC_IDLE state to perform cell reselection is described in detail.

1) In the case of the normal mobility state (other than the medium/high mobility state)

Treselection is not scaled.

2) In the case of the high mobility state

In an E-UTRAN, $Treselection_{EUTRA}$ is multiplied by a scaling factor "sf-high" and scaled.

In a UTRAN, $Treselection_{UTRA}$ is multiplied by the scaling factor "sf-high" and scaled.

In a GERAN, $Treselection_{GERA}$ is multiplied by the scaling factor "sf-high" and scaled.

In CDMA2000 HRPD, $Treselection_{CDMA\_HRPD}$ is multiplied by the scaling factor "sf-high" and scaled.

In CDMA2000 1×RTT, $Treselection_{CDMA\_1\times RTT}$ is multiplied by the scaling factor "sf-high" and scaled.

3) In the case of the medium mobility state

In an E-UTRAN, $Treselection_{EUTRA}$ is multiplied by a scaling factor "sf-medium" and scaled.

In a UTRAN, $Treselection_{UTRA}$ is multiplied by the scaling factor "sf-medium" and scaled.

In a GERAN, $Treselection_{GERA}$ is multiplied by the scaling factor "sf-medium" and scaled.

In CDMA2000 HRPD, $Treselection_{CDMA\_HRPD}$ is multiplied by the scaling factor "sf-medium" and scaled.

In CDMA2000 1×RTT, $Treselection_{CDMA\_1\times RTT}$ is multiplied by the scaling factor "sf-medium" and scaled.

An information parameter (e.g., a scaling factor) for the scaling of the Treselection parameter by UE in the RRC_IDLE state may be included in broadcasted system information and provided to the UE. If an information parameter for scaling is included in system information, UE may perform scaling.

Scaling applied to the TimeToTrigger parameter that is used for UE in the RRC_CONNECTED state to perform a measurement report and/or handover is described in detail below.

1) In the case of the normal mobility state (other than the medium/high mobility state)

TimeToTrigger is not scaled.

2) In the case of the high mobility state

TimeToTrigger is multiplied by a scaling factor "sf-high" and scaled.

3) In the case of the medium mobility state

TimeToTrigger is multiplied by the scaling factor "sf-medium" and scaled.

If a mobility parameter differently scaled depending on the mobility state of UE is applied as described above, a more proper movement may be performed. For example, if UE in the RRC_IDLE state moves at high speed, the UE may determine whether a condition for performing cell reselection has been satisfied within a shorter time and rapidly perform cell reselection on a target cell. Furthermore, if UE in the RRC_CONNECTED state moves at high speed, the UE may determine whether a measured result report condition is satisfied during a specific time within a shorter time, may report a result of the determination, and may perform handover to a target cell more rapidly.

The mobility state of UE may be implemented in various types like a mobility state estimated through the aforementioned MSE. The mobility state of UE may be represented by the actual speed of the UE. Furthermore, the mobility state of UE may be represented by the number of times itself that UE has performed cell movement (cell reselection and/or handover) which has been counted for MSE.

The check of a network on the mobility state of UE may have an important influence on the operation of the network. In deploying cells in a wireless communication system, small cells, such as pico cells and femto cells, may be disposed in the cell coverage of a macro cell. In such a situation, if UE moves to a cell by reselecting the cell while moving or performing handover, a network checks the mobility state of the UE and manages an operation based on the mobility of the UE, which may provide the UE with better service.

A network may be interested in whether UE is in a specific mobility state or whether the UE are in specific mobility states. For example, if UE is in the high mobility state in an environment in which many small cells are deployed in a macro cell, the UE may preferably pass through the small cells without performing a movement on the small cells. In providing support so that such an operation of UE may be managed, a network may be interested in whether the UE is in the high mobility state not in a current mobility state. As described above, a method of grouping the mobility states of UE depending on mobility states interested in by the network and reporting information about the mobility state of the UE may be proposed.

The grouping of mobility states is described below.

A plurality of mobility states of specific types may be grouped, and they may become a plurality of mobility group states. In this case, grouping may be performed so that the number of mobility group states may be smaller than the number of mobility states.

For example, the normal mobility states that belong to a normal mobility state, a medium mobility state, and a high mobility state, that is, three types of mobility states estimated through MSE, may be grouped and may become a first mobility group state. The medium mobility state and the high mobility state may be grouped and may become a second mobility group state. Alternatively, the normal mobility state and the medium mobility state may be grouped and may become a first mobility group state, and the high mobility states may be grouped and may become a second mobility group state.

For another example, grouping may be applied to a mobility state represented by the speed of UE. In such a case, specific speed ranges may be grouped into a specific mobility group state.

Each mobility group state may be configured to include at least one mobility state. The meaning that UE corresponds to a specific mobility group state may mean that the mobility state of the UE corresponds to at least one of mobility states included in the corresponding mobility group state.

A method for reporting information about the mobility state of UE is described below.

Figure 12:
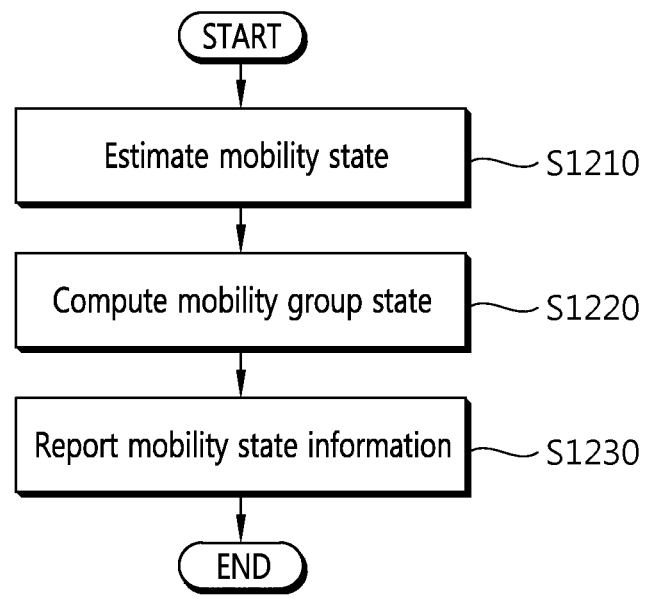
FIG. 12 is a diagram illustrating a method of reporting mobility state information in accordance with an embodiment of the present invention.

FIG. 12 is a diagram illustrating a method of reporting mobility state information in accordance with an embodiment of the present invention.

Referring to FIG. 12, UE estimates a mobility state (S1210). The estimation of the mobility state by the UE may be MSE based on the aforementioned MSE. The UE may determine its own mobility state based on the number of times that the UE has performed cell movements, such as cell reselection and/or handover, for a specific time interval. Accordingly, the UE may determine whether its own mobility state is in a normal mobility state, a medium mobility state, and a high mobility state.

The estimation of the mobility state by the UE may be the measurement of the actual speed of the UE through a GNSS and equipment, such as a GPS. In such a case, the mobility state of the UE may be specified as an actual moving speed.

The UE computes a mobility group state (S1220).

The computation of the mobility group state by the UE may include grouping the mobility states of the UE estimated based on MSE. The UE may group a normal mobility state and a medium mobility state into a first mobility group state and may group high mobility states into a second mobility group state. Furthermore, the UE may group normal mobility states into a first mobility group state and may group a medium mobility state and a high mobility state into a second mobility group state.

The computation of the mobility group state by the UE may include grouping the actual moving speeds of the UE measured through a GNSS.

The grouping of the mobility states by the UE may be based on a grouping configuration from a network. The grouping configuration may be indicative of a scheme for mobility state grouping performed by the UE.

The grouping configuration may be indicative of a specific mobility state interested in by the network. For example, in a mobility state based on MSE, if a network provides UE with a grouping configuration indicative of high mobility states, the UE may group such high mobility states into a second mobility group state and may group the remaining mobility states into a first mobility group state. Accordingly, the network may configure grouping so that interested mobility states are specified as a single mobility group state.

The grouping configuration may indicate whether specific mobility states are grouped into what mobility group state. The grouping configuration may be indicative of the moving speed section of UE that corresponds to the specific mobility group states.

The grouping configuration may be transferred to UE through system information from a specific cell or through dedicated signalling in a specific cell. The grouping configuration may be included in system information transmitted by a specific cell. The grouping configuration may be included in an RRC connection configuration message transmitted by a network (a specific cell) during an RRC connection establishment process. The grouping configuration may be included in an RRC connection reestablishment message transmitted by a network (a specific cell) during an RRC connection reestablishment process. The grouping configuration may be included in an RRC connection reconfiguration message transmitted by a target cell during handover. The grouping configuration may be included in a UE information request message that requests information about UE.

When the grouping configuration is received from the network, the UE may group mobility states in accordance with a grouping scheme indicated by the grouping configuration and compute a mobility group state.

The UE reports the mobility state information to the network (S1230). The report of the mobility state information by the UE may be triggered by the UE itself or may be performed in response to a request from the network.

The triggering of the report of the mobility state information by the UE itself may include the report of the mobility state information to the network when the UE obtains the mobility group state. That is, when the UE obtains its own mobility group state, the UE may report the mobility state information, that is, information about a current mobility group state, to the network while operating along with the network.

The triggering of the report of the mobility state information by the UE itself may include evaluating, by the UE, whether the report condition of the mobility state information is satisfied and determining to report the mobility state information if the report condition is satisfied. If the mobility group state is a specific mobility group state or a mobility group state indicated by the network, the UE may determine that the mobility group state satisfies the report condition of the mobility state information. The UE may compare the mobility group state with a previous mobility group state and determine that the mobility group state has satisfied the report condition of the mobility state information if the mobility group state has been changed.

Mobility state information implemented by UE and a report on the mobility state information may be implemented as follows.

1) The Indication of a Change of a Mobility Group State

If there is a change of an estimated/computed mobility group state in UE, the UE may report, to a network, mobility state information indicative of a change of the mobility group state. In such a case, in determining whether the mobility group state has satisfied the report condition of the mobility state information, the UE may use whether the mobility group state has been changed as a criterion. If the mobility group state has been changed, the UE may determine that the report condition of the mobility state information has been satisfied.

The mobility state information may indicate that UE has entered a specific mobility group state. For example, the mobility state information may indicate that UE has entered a first mobility group state.

The mobility state information may indicate that UE has deviated from a specific mobility group state. For example, the mobility state information may indicate that UE has deviated from a first mobility group state.

In such a case, the mobility state information may be implemented using an indicator of 1 bit and may indicate that the UE has entered or deviated from a considered mobility group state through the implementation of bits.

The mobility state information may be included in an RRC message transmitted by UE and transmitted. The mobility state information may be included in a message transmitted by UE during an RRC connection establishment/reestablishment process and transmitted. For example, the mobility state information may be included in an RRC connection establishment/reestablishment-complete message and transmitted. The mobility state information may be included in a handover-complete message during a handover process and transmitted.

The mobility state information may be reported in response to a request from a network. The network may request mobility state information from UE through a UE information request message. While performing an RRC connection establishment/reestablishment process, the network may provide the UE with an indicator indicative that the UE needs to report the mobility state information. The indicator may be transmitted to the UE through system information. The indicator may be transmitted from the network to the UE during the RRC connection establishment/reestablishment process. The indicator may be included in the UE information request message and transmitted. In such a case, the mobility state information may be included in a UE information message transmitted in response to the UE information request message and transmitted.

The mobility state information may be included in another RRC message, such as a measurement report message, and transmitted. UE may include the mobility state information in a measurement report message that reports an RRM measured result and send the measurement report message to a network. The transmission of the mobility state information together with the measured result report by the UE may be performed by the configuration of the network. That is, the network may include a grouping configuration and/or a configuration related to a mobility information report in a measurement configuration message and provide the UE with the measurement configuration message. Accordingly, the UE may perform mobility state grouping based on the measurement configuration message, may include the mobility state information in the measurement report message, and may send the measurement report message.

If a mobility group state has not been changed although it is checked that a mobility state has been changed as a result of MSE, UE may not report mobility state information to a network. For example, assuming that a first mobility group state includes a normal mobility state and a medium mobility state, although the mobility state of UE has changed from the normal mobility state to the medium mobility state, the UE does not report mobility state information indicative that a mobility group state has been changed. That is, the mobility state information may be reported to a network when the mobility group state is changed.

2) The Indication of a Specific Mobility Group State

If UE is in a specific mobility group state, the UE may report mobility state information indicative of the corresponding mobility group state to a network. In such a case, in determining whether a mobility group state has satisfied the report condition of the mobility state information, the UE may use whether the mobility group state of the UE corresponds to a specific mobility group state as a criterion. If the mobility group state is a corresponding mobility group state, the UE may determine that the report condition of the mobility state information has been satisfied. The UE may report the mobility state information only when it is in a specific mobility group state and may not report the mobility state information only when it is other mobility group states. Alternatively, the UE may report mobility state information indicative of whether it is in a specific mobility group state.

The mobility state information may be included in an RRC message transmitted by the UE and transmitted. The mobility state information may be included in a message transmitted by the UE while the UE performs an RRC connection establishment/reestablishment process and transmitted. For example, the mobility state information may be included in an RRC connection establishment/reestablishment-complete message and transmitted. The mobility state information may be included in a handover-complete message during a handover process and transmitted.

The mobility state information may be reported in response to a request from a network. The network may request the mobility state information from UE through a UE information request message. While performing an RRC connection establishment/reestablishment process, the network may provide the UE with an indicator indicative that the UE needs to report the mobility state information. The indicator may be transmitted to the UE through system information. The indicator may be transmitted from the network to the UE during the RRC connection establishment/reestablishment process. The indicator may be included in the UE information request message and transmitted. In such a case, the mobility state information may be included in a UE information message transmitted in response to the UE information request message and transmitted.

The mobility state information may be included in another RRC message, such as a measurement report message, and transmitted. UE may include the mobility state information in a measurement report message that reports an RRM measured result and send the measurement report message to a network. The transmission of the mobility state information together with the measured result report by the UE may be performed by the configuration of the network. That is, the network includes a grouping configuration and/or a configuration related to a mobility information report in a measurement configuration message and provides the UE with the measurement configuration message. Accordingly, the UE may perform mobility state grouping based on the measurement configuration message, may include the mobility state information in a measurement report message, and may send the measurement report message.

A specific mobility group state may be configured by a network. A specific mobility group state may be transferred to UE through system information from a specific cell or through dedicated signalling from a specific cell. If dedicated signalling is used, information indicative of a specific mobility group state may be included in an RRC connection configuration/reconfiguration message or an RRC connection reestablishment message and transmitted. Information indicative of a specific mobility group state may be included in an RRC connection reconfiguration message during handover and transmitted. Information indicative of a specific mobility group state may be included in a UE information request message and transmitted. A specific mobility group state may be a mobility group state including specific mobility states that are indicated by a grouping configuration and that are interested in by a network.

3) The Indication of a New Mobility Group State

If there is a change of an estimated/computed mobility group state in UE, the UE may report mobility state information indicative of a new mobility group state to a network. In such a case, in determining whether a mobility group state has satisfied the report condition of mobility state information, the UE may use whether the mobility group state has been changed as a criterion. If the mobility group state has been changed, the UE may determine that the report condition of the mobility state information has been changed.

The mobility state information may be implemented using an indicator of two or more bits. A new mobility group state for UE may be indicated through the implementation of bits.

The mobility state information may be included in an RRC message transmitted by the UE and transmitted. The mobility state information may be included in a message transmitted by the UE while the UE performs an RRC connection establishment/reestablishment process and transmitted. For example, the mobility state information may be included in an RRC connection establishment/reestablishment-complete message and transmitted. The mobility state information may be included in a handover-complete message during a handover process and transmitted.

The mobility state information may be reported in response to a request from a network. The network may request the mobility state information from UE through a UE information request message. While performing an RRC connection establishment/reestablishment process, the network may provide the UE with an indicator indicative that the UE needs to report the mobility state information. The indicator may be transmitted to the UE through system information. The indicator may be transmitted from the network to the UE during the RRC connection establishment/reestablishment process. The indicator may be included in the UE information request message and transmitted. In such a case, the mobility state information may be included in a UE information message transmitted in response to the UE information request message and transmitted.

The mobility state information may be included in another RRC message, such as a measurement report message, and transmitted. UE may include the mobility state information in a measurement report message that reports an RRM measured result and send the measurement report message to a network. The transmission of the mobility state information together with the measured result report by the UE may be performed by the configuration of the network. That is, the network includes a grouping configuration and/or a configuration related to a mobility information report in a measurement configuration message and provides the UE with the measurement configuration message. Accordingly, the UE may perform mobility state grouping based on the measurement configuration message, may include the mobility state information in a measurement report message, and may send the measurement report message.

UE may not report mobility state information to a network if a mobility group state has not been changed although a mobility state has been changed based on MSE. For example, assuming that a first mobility group state includes a normal mobility state and a medium mobility state, although the mobility state of UE has changed from the normal mobility state to the medium mobility state, the UE does not report mobility state information indicative that the mobility group state has been changed.

In the embodiment of the present invention illustrated in FIG. 12, the UE may notify the network whether it has mobility state information to be additionally reported by the UE. In such a case, the network may instruct the UE to report the mobility state information in response to the notification of the UE. If information providing notification that the mobility state information exists is received, the network may request the UE to report the mobility state information. The UE may include the information about whether the mobility state information is present or not in an RRC connection-complete message, an RRC connection reestablishment-complete message, and/or a handover-complete message and send such a message.

Figure 13:
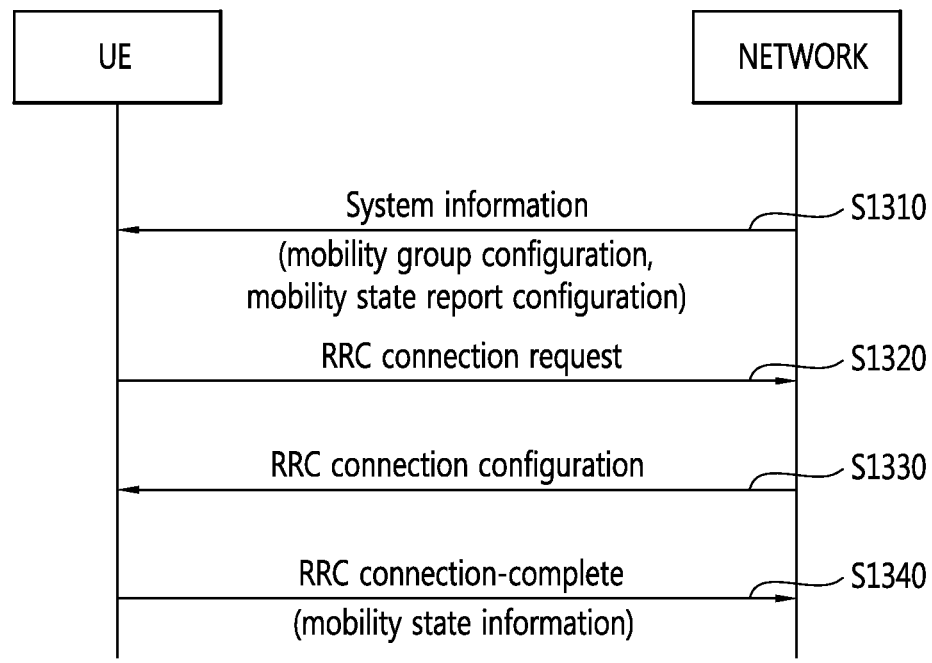
FIG. 13 is a diagram illustrating an example of a method of reporting mobility state information in accordance with an embodiment of the present invention.

FIG. 13 is a diagram illustrating an example of a method of reporting mobility state information in accordance with an embodiment of the present invention.

Referring to FIG. 13, UE receives system information from a network (S1310). The system information may include a mobility grouping configuration and/or a mobility state report configuration.

The mobility grouping configuration includes information for configuring a mobility state grouping scheme performed by the UE. After estimating a mobility state, the UE may compute a mobility group state based on the mobility grouping configuration received from the network.

The mobility state report configuration may include information for configuring the mobility state information report criterion of the UE. The UE may determine whether the report criterion provided by the mobility state report configuration is satisfied based on the computed mobility group state and may determine whether or not to report mobility state information. The mobility state report configuration may be indicative of the reporting type of the mobility state information. The UE may report the mobility state information based on a type indicated by the mobility state report configuration.

The UE, together with the network, performs an RRC connection establishment process. To this end, the UE sends an RRC connection request message (S1320), receives an RRC connection configuration message (S1330), and sends an RRC connection-complete message (S1340). If the UE has determined to report mobility state information, the UE may include the mobility state information in the RRC connection-complete message and/or an RRC connection request message and send the RRC connection-complete message and/or the RRC connection request message. The mobility state information reported as described above may be implemented to have a type according to the mobility state report configuration configured by the network.

The RRC connection request message may include an indicator that provides notification that there is mobility state information to be reported by the UE. If the report condition of the mobility state information is satisfied and thus the UE determines to report the mobility state information, the UE may include an indicator indicative that it has the mobility state information in the RRC connection request message and send the RRC connection request message.

The RRC connection configuration message may include information that instructs the UE to report the mobility state information. The information that instructs the report of the mobility state information may be included in an RRC connection configuration message in response to the indicator indicative that the mobility state information to be reported is present in the RRC connection request message. The UE may report the mobility state information in response to the instruction of the report on the mobility state information.

The mobility state information having the aforementioned various types may be implemented in response to a request from a network. The network may send mobility state information type indication indicative of a specific one of the aforementioned types to UE. The UE may generate mobility state information based on the mobility state information type indication and report the mobility state information. The mobility state information type indication may be provided to the network when the network requests a mobility state information report.

The network may check the mobility group state of the UE based on the mobility state information reported by the UE. The UE manages the network based on a result of the check, thus being capable of providing service to corresponding UE more efficiently.

In accordance with an embodiment of the present invention, UE may provide a network with information about a mobility group state instead of a mobility state. The UE may provide the network with the information about the mobility group state during a process of configuring RRC connection because the information about the mobility group state may be implemented to have a smaller size than information directly indicative of the mobility state. Accordingly, service can be configured/managed so that further improved service is provided to the UE because information relating to a mobility state is provided to the network when the UE joins the network.

In accordance with an embodiment of the present invention, UE may report an estimated/computed mobility group state to a network depending on the estimated/computed mobility group state. Accordingly, the network may check whether the UE corresponds to the mobility state of the UE, in particular, a mobility state interested in by the network. Efficiency can be further improved because a network can be managed based on mobility state information reported by UE.

Figure 14:
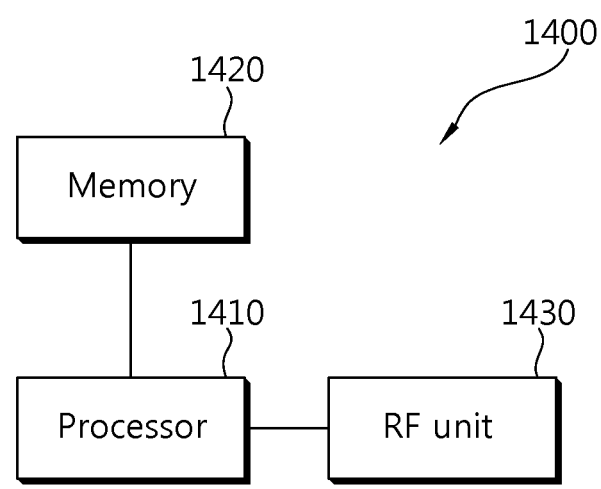
FIG. 14 is a block diagram illustrating a wireless apparatus in which an embodiment of the present invention is implemented.

FIG. 14 is a block diagram illustrating a wireless apparatus in which an embodiment of the present invention is implemented. The apparatus may implement the operations of the UE and/or the network that performs the aforementioned embodiments described with reference to FIGS. 12 and 13.

The wireless apparatus 1400 includes a processor 1410, memory 1420, and a Radio Frequency (RF) unit 1430.

The processor 1410 may be configured to implement the aforementioned embodiments of the present invention described with reference to the drawings. The processor 1410 may be configured to estimate a mobility state and compute a mobility group state based on the estimated mobility state. The processor 1410 may be configured to generate mobility state information based on a mobility group state and report the mobility state information to a network.

The RF unit 1430 is connected to the processor 1410 and sends and receives radio signals.

The processor 1410 and the RF unit 1430 may be implemented to send and receive radio signals according to one or more communication standards. The RF unit 1430 may include at least one transceiver capable of sending and receiving radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of reporting mobility state information performed by user equipment (UE) in a wireless communication system, the method comprising:
    estimating, by the UE, a mobility state of the UE, wherein the mobility state is one of a normal mobility state, a medium mobility state, or a high mobility state;
    determining, by the UE, a mobility group state of the mobility state, wherein the mobility group state is one of a first mobility group state or a second mobility group state; and
    reporting, by the UE, mobility state information for the mobility group state to a network,
    wherein the mobility state is estimated based on a number of cell movements performed by the UE during a specific time interval on a basis of a Mobility State Estimation (MSE).
2. The method of claim 1, wherein the method further comprises:
    determining whether the report condition of the mobility state information is satisfied; and
    wherein the reporting the mobility state information is performed when the report condition of the mobility state information is satisfied.
3. The method of claim 2, wherein if the mobility group state has been changed as a result of a comparison between the mobility group state and a previous mobility group state, the mobility group state satisfies the report condition of the mobility state information.
4. The method of claim 3, wherein the mobility state information indicates that the mobility group state has been changed.
5. The method of claim 4, wherein the mobility state information is indicative of the mobility group state.
6. The method of claim 2, wherein if the mobility group state is a specific mobility group state, the mobility group state satisfies the report condition of the mobility state information.
7. The method of claim 6, wherein the mobility state information indicates that the computed mobility group state corresponds to the specific mobility group state.
8. The method of claim 7, wherein the specific mobility group state is configured by the network.
9. The method of claim 1, wherein the determining the mobility group state comprises:
    determining the mobility group state to be the first mobility group state if the estimated mobility state is the normal mobility state or the medium mobility state; and
    determining the mobility group state to be the second mobility group state if the estimated mobility state is the high mobility state.
10. The method of claim 9, wherein the method further comprises:
    receiving, from the network, a grouping configuration indicating a criterion for the determining the mobility group state,
    wherein the determining the mobility group state is based on the grouping configuration.
11. The method of claim 1, wherein the determining the mobility group state comprises:
    determining the mobility group state to be the first mobility group state if the estimated mobility state is the normal mobility state; and
    determining the mobility group state to be the second mobility group state if the estimated mobility state is the high mobility state or the medium mobility state.
12. The method of claim 11, further comprising receiving a grouping configuration indicative of a criterion for grouping the estimated mobility state from the network, wherein grouping the estimated mobility state is performed based on the grouping configuration.
13. The method of claim 1,
    wherein the mobility state information is reported via a Radio Resource Control (RRC) connection configuration-complete message when the UE establishes a RRC connection with the network, or
    the mobility state information is reported via a RRC connection reestablishment-complete message when the UE reestablishes the RRC connection with the network.
14. The method of claim 1, wherein the mobility state information is reported via a handover-complete message.
15. The method of claim 1, wherein the method further comprises:
    receiving, from the network, a UE information request; and
    reporting, to the network, a UE information message in response to the UE information request,
    wherein the mobility state information is reported via the UE information message.
16. A user equipment (UE) operating in a wireless communication system, the user equipment comprising:
    a Radio Frequency (RF) unit configured to send and receive radio signals; and
    a processor functionally coupled with the RF unit and driven, wherein the processor is configured to:

estimate a mobility state of the UE, wherein the mobility state is one of a normal mobility state, a medium mobility state, or a high mobility state, determine a mobility group state of the mobility state, wherein the mobility group state is one of a first mobility group state or a second mobility group state, and report, to a network via the RF unit, mobility state information for the mobility group state, wherein the mobility state is estimated based on a number of cell movements performed by the UE during a specific time interval on a basis of a Mobility State Estimation (MSE).

\* \* \* \* \*